(12) United States Patent
López-Reina Torrijos

(10) Patent No.: US 8,711,540 B2
(45) Date of Patent: Apr. 29, 2014

(54) DEVICE FOR INSTALLING CONDUCTING COMPONENTS IN STRUCTURES

(75) Inventor: José Ignacio López-Reina Torrijos, Madrid (ES)

(73) Assignee: Airbus Operations, S.L., Madrid (ES)

( * ) Notice: Subject to any disclaimer, the term of this patent is extended or adjusted under 35 U.S.C. 154(b) by 387 days.

(21) Appl. No.: 13/024,378

(22) Filed: Feb. 10, 2011

(65) Prior Publication Data

US 2011/0247203 A1 Oct. 13, 2011

(30) Foreign Application Priority Data

Apr. 30, 2010 (ES) .................................. 201030648

(51) Int. Cl.
*H01H 50/12* (2006.01)
(52) U.S. Cl.
USPC ......................................... 361/218; 361/212
(58) Field of Classification Search
USPC .......................................... 361/212, 220, 218
See application file for complete search history.

(56) References Cited

U.S. PATENT DOCUMENTS

| | | | |
|---|---|---|---|
| 3,989,984 A * | 11/1976 | Amason et al. ............... | 361/212 |
| 5,195,855 A * | 3/1993 | Atkinson et al. ............... | 411/43 |
| 5,865,397 A * | 2/1999 | Herrmann ....................... | 244/14 |
| 7,307,825 B2 * | 12/2007 | De La Fuente De Ana et al. ............................. | 361/212 |
| 2007/0107196 A1 * | 5/2007 | Haas et al. ................... | 29/524.1 |

FOREIGN PATENT DOCUMENTS

| | | |
|---|---|---|
| EP | 1 484 245 A1 | 12/2004 |
| EP | 1 826 120 A2 | 8/2007 |
| FR | 2 924 686 A1 | 6/2009 |
| WO | 2006/069996 A1 | 7/2006 |

OTHER PUBLICATIONS

International Search Report dated Oct. 19, 2011 for Application No. PCT/ES2011/070289.

* cited by examiner

*Primary Examiner* — Danny Nguyen
(74) *Attorney, Agent, or Firm* — Ladas & Parry LLP

(57) ABSTRACT

A device (1) for the installation of a conducting component (2) on a structure (3) made from composite material, the inside of this structure (3) comprising a substance which can be ignited, which comprises an installation element (4) onto which the conducting component (2) is positioned, a conducting insert element (5), by means of which the installation element (4) is joined to the composite material structure (3) by its internal part, a conducting layer (6) arranged on the external part of the installation element (4) and a conducting fixing element (7) which joins the structure (3) and the installation element (4) to the insert element (5) and the conducting layer (6) so that the device (1) defines a low impedance current path through the conducting layer (6) and the insert element (5) through which the energy is dissipated from an atmospheric discharge to the component (2) or to the structure (3), the interior face of the structure (3) remaining isolated.

12 Claims, 1 Drawing Sheet

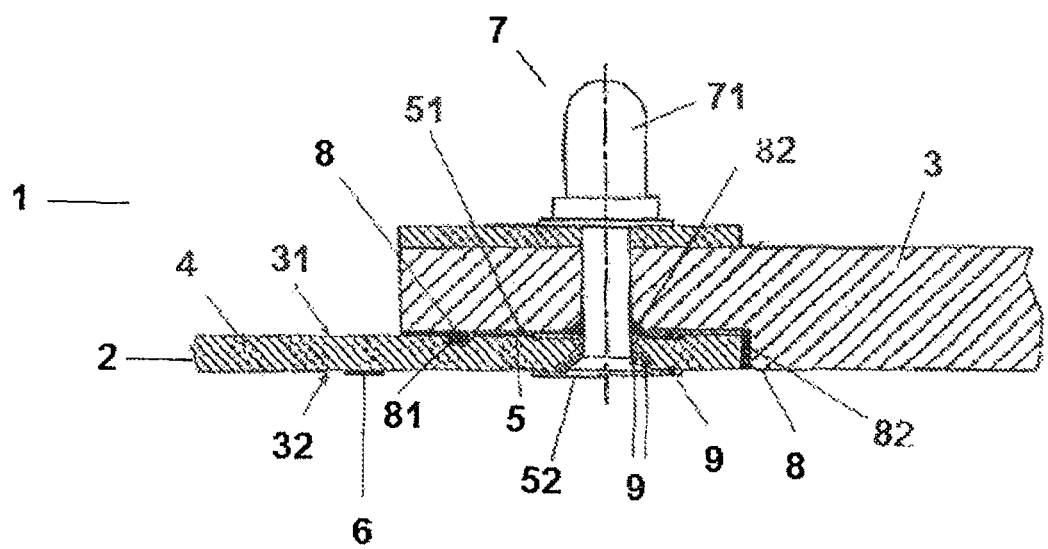

DEVICE FOR INSTALLING CONDUCTING COMPONENTS IN STRUCTURES

FIELD OF THE INVENTION

This invention refers to a device for installing conducting components in structures, in particular in aeronautical structures made from composite material.

BACKGROUND OF THE INVENTION

The intensive introduction of advanced composite materials into primary structures for aircraft has become one of the priority objectives in the design and manufacturing of a new generation of aircraft due to the possibilities they provide for structural optimisation. As such, a large proportion of current aeronautical structures are made from composite materials.

As is well known, these composite materials have very low or zero electrical conductivity, with these electrical properties being insufficient to protect the different, generally metallic, components or equipment installed on the aforementioned aeronautical structures made from composite material, in the case that any electrical discharge takes place to them. In these cases, the composite material structures themselves are seriously damaged.

In the traditional cases in which the aeronautical structures are made from metallic material (generally aluminium alloys) the, typically metallic conducting components or equipment which need to be joined to these structures are connected directly by riveting or by means of conducting metallic joints. This solution, however, is not valid in the case that the aeronautical structure is made from composite material, given that it would not inherently provide a low impedance path for the electrical current from, for example, an electrical discharge to the structure, which would be capable of protecting both the metallic component or equipment and the composite material structure.

In the particular cases in which the composite material structures belong to parts of the aircraft at high risk from discharges, such as is the case for structures through which fuel for the aircraft passes, the direct installation of metallic components or equipment onto the composite material structure would provide a path for the electrical current with high electrical impedance, which would translate into irreversible damage in the component or equipment, as well as to the composite material structure itself, in the case of a strike by or the passage of current (for example, from a lightning strike to the aircraft structure). In addition, strikes from, for example, lightning, provide extremely high currents of up to 100,000 amperes.

The known solutions raise the problem that they either protect the metallic equipment or component or the composite material structure itself, but not both and not properly. In these known solutions, it is common to protect the composite material by means of a metallic mesh or layer, with the metallic equipment or component inherently having a degree of surface conductivity which permits the passage of current. However, these solutions are not appropriate, in particular in the interface or junction between the metallic equipment or component and the composite material structure: the problem lies in the fact that it is very complicated to arrange the aforementioned interface between the equipment and the structure so that the transfer of current takes place safely between the two elements.

On the other hand, these known solutions do not consider the case in which an electrical discharge occurs from electrical charge accumulated by an electrostatic effect: the surface protection of the metallic equipment or component is not taken into account, nor is it provided with sufficient residual conductivity capable of draining the accumulated electrostatic charge in a controlled way.

It would, therefore, be desirable to develop a configuration for the fastening of metallic components or equipment installed onto composite material structures with low conductivity, so as to provide an appropriate path so that the current either from a discharge or from the accumulated charge from an electrostatic effect can move between the structure and the component or equipment without causing damage to either of the two elements.

This invention is aimed at achieving the above objectives.

SUMMARY OF THE INVENTION

The objective of this invention is to provide a device for installing conducting components in structures, in particular in aeronautical structures made from composite material.

This objective is achieved by means of a device which comprises an installation element onto which the conducting equipment or component is secured, a conducting insert element, through which the installation element is connected to the composite material structure through its internal part, a conducting layer, arranged on the external part of the installation element and a conducting fixing element which joins the composite material structure and the installation element, together with the insert element and the conducting layer. The configuration described of the abovementioned device manages to ensure, for the case of an atmospheric discharge onto the composite material structure or onto the conducting component or equipment, the existence of a low impedance path for the current, such that the aforementioned current is dissipated through the skin into the rest of the structures in a controlled manner and does not cause damage either to the conducting component or equipment or the composite material structure.

In a preferred embodiment of this invention, the aforementioned device also comprises some sealing elements which close the composite material structures in a leaktight form, so avoiding possible fuel leaks from them and preventing degasification.

Other characteristics and advantages of this invention will emerge from the following detailed description.

DESCRIPTION OF THE FIGURES

FIG. 1 shows, in diagram form, the device for the installation of metallic components on composite material structures as per the invention.

DETAILED DESCRIPTION OF THE INVENTION

This invention refers to a device 1 for installing conducting components 2 or equipment, preferably made of metal, on structures 3, preferably aeronautic structures, of high electrical impedance, these structures 3 preferably being made of composite material. The interior of these structures 3 usually comprises highly flammable material, such as fuel. In general, these structures 3 belong to any element of a fuel tank which stores any gas or mixture of gases whose vapour can ignite at energies of 200 microjoules and up. This value, for the specific case of aeronautical structures, is given by the characteristics of the kerosene fuel used in aviation. The device 1 of the invention is capable of providing the component 2, which is connected to the structure 3 of the aircraft, with the electrical continuity necessary to prevent damage both to the structure 3 and the component 2 in the case of an electrical discharge. This discharge may come either from atmospheric discharges, for example a lightning strike, or from the discharge of static electricity accumulated in the conducting component 2.

The device 1 comprises an installation element 4, which can be made from a composite material or a metallic conducting material, on which the conducting component 2 is located, a conducting insert element 5, by means of which the installation element 4 is connected to the composite material structure 3 by its upper part 31, a conducting layer 6, preferably in the form of a conducting mesh, arranged in the lower part 32 of the installation element 4, and a conducting fixing element 7 which joins the structure 3 and the installation element 4, together with the insert element 5 and the conducting mesh 6. The configuration described of the abovementioned device 1 manages to ensure, for the case of an electrical discharge onto the aircraft, whether this affects the structure 3 or the component 2, the existence of a low impedance path for the current, such that the aforementioned current is dispersed externally into the rest of the aircraft's structures in a controlled manner and does not cause damage either to the component 2 or the composite material structure 3: typically, the value of the electrical resistance of the current path created is less than 10 milliohms, measured under direct current conditions, which are the most representative conditions for atmospheric discharges. In FIG. 1, the interior part of the aircraft structure is on the same side as the fixing element 7, while the exterior part of the aircraft is that of the conducting mesh 6.

In the invention, therefore, a device 1 is proposed to fasten or connect a conducting component 2 to a structure 3 with high impedance, preferably made in composite materials, typically carbon fibre or glass fibre. In general, the structure 3 will be of a high resistance material, such as resin doped with some conducting type element. The material of the structure 3 is typically polyether ether ketone (known as PEEK), reinforced with 30% carbon fibre, as this is a non-conducting material, but it is capable of draining into the rest of the structure the currents for atmospheric discharges and accumulated electrostatic charge.

In a preferred embodiment of this invention, the system also comprises some sealing elements 8 which close the composite material aeronautical structures 3 in a leaktight form, so avoiding possible fuel leaks from them and preventing degasification of the aforementioned fuel. The sealing elements 8 preferably comprise a sealing gasket 81 and a sealant 82 arranged at certain locations, as shown in FIG. 1.

In a preferred embodiment of the invention, the insert element 5 preferably comprises a conducting ring 51 and a highly conductive element 52, typically in the form of a washer.

When lightning strikes the outside part of the aircraft and this lightning impacts the low electrical conductivity structure 3, the current dissipates through the highly conductive element 52, passing from there to the conducting mesh 6 of the installation element 4 and from there to the rest of the aircraft. When a strike occurs due to lightning on the conducting component 2, or a discharge occurs in it caused by the discharge of accumulated static electricity in the aforementioned conducting component 2, the current is then dissipated to the rest of the aircraft components through the conducting mesh 6 of the installation element 4, not penetrating to the low conductivity structure 3 due to the existence of the conducting ring 51 which carries the current through the upper part 31 of the installation element 4.

As such, the objective of the device 1 of the invention is to keep the internal face of the structure 3, made from composite material, isolated at all times (the internal part of the aircraft is on the side of the fixing element 7, as shown in FIG. 1). In this way, the device 1 of the invention described above manages to focus the current from a lightning strike or from a discharge from accumulated static electricity, onto the outer part of the aircraft skin, preventing in all cases the occurrence of a source or focus of ignition within the area which can ignite, inside the aircraft (internal part of the aircraft structure, which is on the side of the fixing element 7), which is an area which contains highly flammable fuel.

In a preferred embodiment of the invention, the fixing element 7 comprises a rivet or bolt 71, preferably made from titanium.

Another of the requirements of the device 1 of the invention is that it is a fail-safe type device: to meet the high safety requirements in the aeronautical field, tests are carried out to certify proper operation of the device 1, even in those cases of incorrect installation of the device 1, such that the device 1 operates appropriately even when the rivets or bolts 71 are loose (these rivets may remain loose, for example, after maintenance tasks or after the assembly of the component 2 to the composite material structure 3).

In a preferred embodiment of the invention, the conducting mesh 6 comprises a mesh preferably made from bronze and preferably with a weight of between 80 gsm and 370 gsm.

According to another preferred embodiment of this invention, the component 2 belongs to the conducting covers, typically made from metal, of the static ventilation inlet (or the static pressure inlet) located in the horizontal stabiliser of an aircraft, where these covers are installed in the lower skin, which would constitute the stabiliser's composite material structure 3, in the zone of the ventilation tank made from non-conducting composite material. The system 1 of the invention must also satisfy the requirement for the conductive covers of the components 2 to be removable, also being, in many cases, exchangeable between different aircrafts. The direct installation of this component 2 to the composite material structure 3 would give high electrical impedance in the joint, which would translate to irreversible damage in the component 2 and the structure 3 in the case of a strike or the passage of current (for example from a lightning strike). With the device 1 described, currents of up to 100,000 amperes can be carried without causing damage to the structure 3 or the installed component 2 itself: these are the conditions for the electrical tests carried out according to aeronautical classification or zoning 2A, with 100,000 A. The device 1, by means of the connection of the high conductivity elements, such as the ring 51 and the element 52, arranged between the two elements of the joint, the structure 3 and the component 2, allows the electrons of the current to flow between the two elements, 2 and 3, without causing any damage, given the low electrical resistance offered both by the ring 51 and the element 52, which is usually less than 10 milliohms. This value corresponds to the quality and control value used to set the maximum upper limit for the resistivity between the structure 3 and the component 2, so that the necessary charge transfer takes place between the two elements.

As such, according to the device 1 described, the connection to evacuate the electrical current from a lightning strike or a fault current derived from the element 2 itself is made by means of the insert element 5, which in turn comprises a highly conductive element 52 with special geometry and a ring 51, preferably made of nickel. Nickel is used for preference because it is a material which is galvanically compatible with the structure 3, with which low impedance values are obtained and galvanic corrosion is prevented. A material such as titanium is not preferred because it adds weight to the structure, which is critical in aeronautics. The element 52, typically in the form of a washer, permits electrical conduction between the conducting mesh 6 of the installation element 4 and the ring 51 with the composite material structure 3.

The ring 51 is made from an expanded copper foil or it comprises a bronze mesh. In the case of this being a bronze mesh, the weight will be considered to be light when this lies between 70 and 370 gsm. Its weight will be considered heavy when this value is above 790 gsm.

The device 1 of the invention has been tested successfully against electrical discharges representative of a real lightning strike for current values of up to 100,000 amperes, without ignition of the flammable gases inside the structure 3 containing fuel. No light was recorded either from sparking or hotspots during the test.

The arrangement of the device 1 described achieves impedances in direct current of under 10 milliohms between the installed component 2 and the rest of the structure 3. With this low impedance, transmission of the high electrical charges is permitted, so improving the capacity of the device 1 when it comes to preventing explosions and structural damage to structures 3 containing fuel.

As shown in FIG. 1, device 1 also comprises several earthing connections 9.

Those modifications comprised within the scope defined by the following claims may be introduced to the preferred embodiments described above.

The invention claimed is:

1. A device for the installation of a conducting component on a structure made from composite material, the inside of this structure comprising a substance which can be ignited, wherein said device comprises an installation element on which the conducting component is positioned, a conducting insert element, by means of which the installation element is joined to the composite material structure by its internal part, a conducting layer arranged on the external part of the installation element and a conducting fixing element which joins the structure and the installation element to the insert element and the conducting layer so that the device defines a low impedance current path through the conducting layer and the insert element through which the energy is dissipated from an atmospheric discharge to the component or to the structure, the interior face of the structure remaining isolated; wherein said device further comprises sealing elements which close said structures in a leak-tight form and prevent degasification, said sealing elements comprising a sealing gasket and a sealant.

2. A device according to claim 1, in which the insert element comprises a ring, both of which are conductors.

3. A device according to claim 1, in which the ring is made of nickel.

4. A device according to claim 1, in which the ring is made of expanded copper foil.

5. A device according to claim 2, in which the element is a washer.

6. A device according to claim 1, in which the fixing element comprises a conducting rivet.

7. A device according to claim 1, in which the conducting layer is a mesh made from bronze.

8. A device according to claim 1, in which the installation element is metallic or made from composite material.

9. A device according to claim 1, in which the structure is a high resistance material.

10. A device according to claim 9, in which the structure is made of polyether ether ketone reinforced with 30% carbon fibre.

11. An aircraft which includes a device according to claim 1.

12. An aircraft according to claim 11, in which the component belongs to an item of aircraft equipment exposed to atmospheric charges, this equipment being installed on the skin of a fuel tank.

* * * * *